United States Patent Office 3,518,961
Patented July 7, 1970

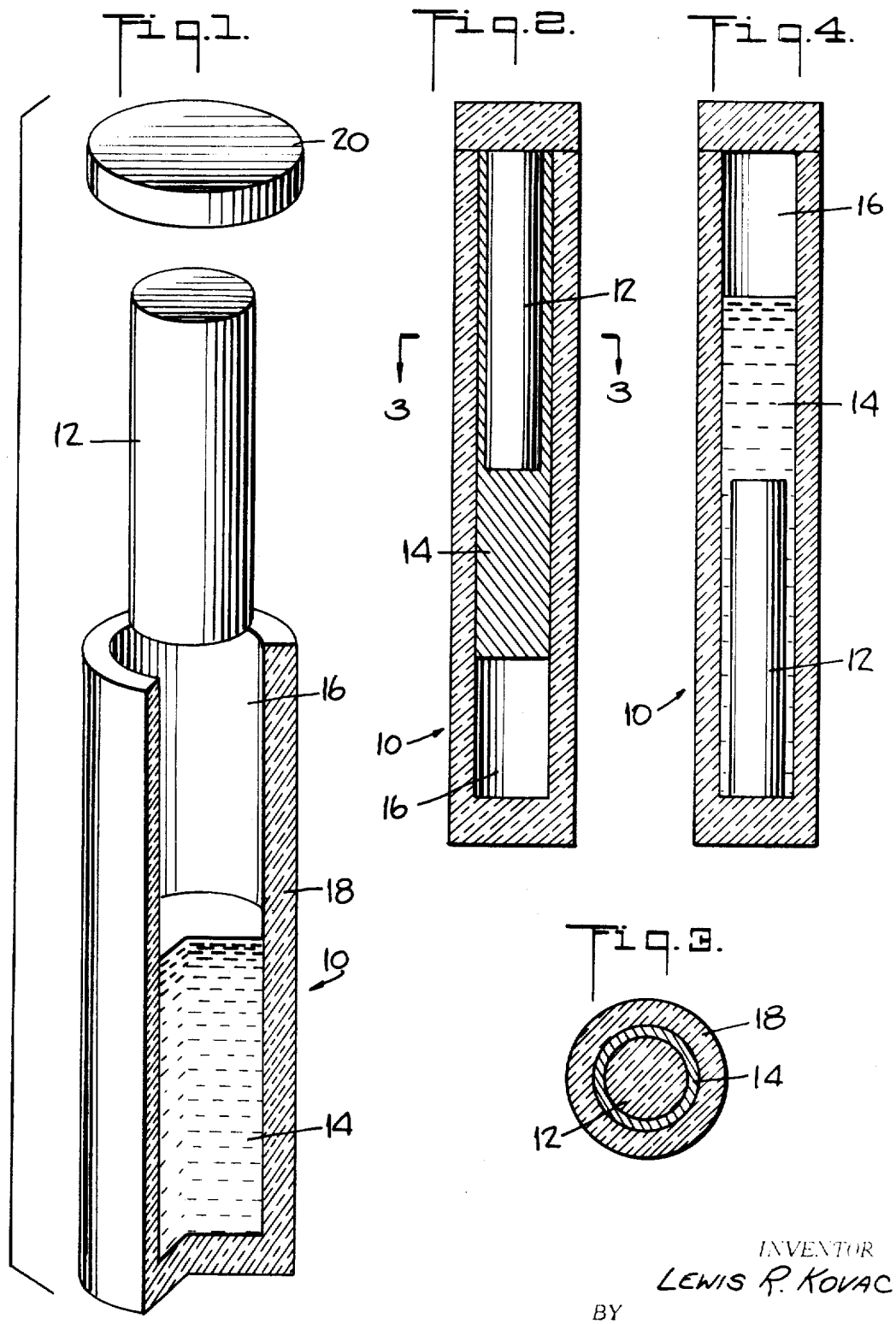

3,518,961
TEMPERATURE INDICATING DEVICE
Lewis R. Kovac, Berkley, Mich., assignor to Atomic Power Development Associates, Inc., Detroit, Mich., a corporation of New York
Filed May 14, 1968, Ser. No. 728,952
Int. Cl. G01d 21/00
U.S. Cl. 116—114.5                                    4 Claims

ABSTRACT OF THE DISCLOSURE

A temperature indicating device embodying a sealed capsule containing a fusible member and a high density pin frozen in place in the fusible member. The structure permits determining whether or not the temperature of fusion of the fusible member has been obtained without destruction of the capsule. Upon melting of the fusible member, the force of gravity causes the high density pin to sink to the bottom of the capsule. The change in position of the pin is determined by the change in the center of gravity of the capsule, or by radiographic examination.

---

This invention has to do with a temperature indicating device which is particularly adapted, among other possible uses, for determining the maximum temperature developed in radioactive systems or in other systems where it is not feasible to use thermoelectric or thermoexpansion devices.

The invention has as one of its objectives, the provision of a new and improved temperature indicating device which is inexpensive to fabricate and simple to operate, as compared to prior art such devices.

The invention provides as another of its objectives a device of the character aforesaid having greatly increased operating life without repairs or adjustments. The invention provides as still another of its objectives, a device as aforesaid which is reusable, which may be employed in locations subject to radiation or in other types of inaccessible locations, and which is accurate in operation.

These and other advantages of the device of the invention as compared to temperature indicating devices and techniques heretofore utilized for the above-stated purposes, will become apparent as the description proceeds.

My invention provides a temperature indicating device including a sealed capsule which contains a fusible member. The fusible member is chosen to have a preselected melting point. A pin is disposed in the fusible member, the pin and the capsule having higher melting points than the member. Further, it will be appreciated that the pin has a specific gravity which is greater than the specific gravity of the fusible member when the member is in its liquid state. In addition, the pin is retainable at one end of the capsule by the fusible member when the fusible member is in its solid state, and the pin is movable by the force of gravity to the other end of the capsule when the fusible member changes from its solid state to its liquid state.

In one form of the invention, the fusible member does not completely fill the capsule, thereby leaving a void space for expansion.

There has thus been outlined rather broadly the more important features of the invention in order that the detailed description thereof that follows may be better understood, and in order that the present contribution to the art may be better appreciated. There are, of course, additional features of the invention that will be described hereinafter which will form the subject of the claims appended hereto. Those skilled in the art will apprecaite that the conception on which this disclosure is based may readily be utilized as the basis for the design of other structures for carrying out the several purposes of the invention. It is important, therefore, that the claims be regarded as including such equivalent constructions as do not depart from the spirit and scope of the invention.

One embodiment of the invention is chosen for purposes of illustration and description, and is shown in the accompanying drawings, forming a part of the specification wherein:

FIG. 1 is an exploded perspective view showing a temperature indicating device constructed in accordance with the concept of my invention;

FIG. 2 is a longitudinal section view, drawn to a reduced scale, showing the device in its first position;

FIG. 3 is a transverse sectional view taken along the line 3—3 of FIG. 2; and

FIG. 4 is a longitudinal view similar to FIG. 3, but showing the device in its second position.

In the embodiment of the invention illustrated, the temperature indicating device comprises a refractory metal capsule indicated generally at 10, containing a refractory metal pin 12, frozen into a fusible member 14 which in completely fills the capsule in order to leave a void space 16 for expansion when the fusible member melts into its liquid state.

In assembling the temperature indicating device, the uncapped capsule bottom 18 is partially filled with the fusible member 14, as best seen in FIG. 1. While, the fusible member is still in its molten or liquid state, the pin is inserted and allowed to sink to the bottom of the molten fusible member because the specific gravity of the pin is greater than the specific gravity of this member when the latter is in its liquid state. The fusible member is then allowed to solidify and the air is removed from the void space 16 producing a partial vacuum therein. Thence, a cap 20 is placed on the capsule botom 18 and secured thereto in sealed relationship. Any suitable method may be employed to seal the capsule, such as electron beam welding, for example.

The capsule 10 may be fabricated from any suitable material which is inert to its external environment, and which has a higher melting point than the fusible member 14. Such a material may be molybdenum, for example.

A refractory metal pin 12 may be fabricated from any suitable material which has a higher melting point than the melting point of the fusible member 14. In addition, the pin must have a higher specific gravity than the fusible member 14, as pointed out hereinbefore. Tungsten is a satisfactory material, for example. The fusible member may be fabricated from any material which has a preselected, desired melting point. The material must be compatible with the material selected for the capsule 10. Suitable materials include lead or an alloy of lead, aluminum or an alloy of aluminum, for example, Other suitable materials include salts such as phosphates or chlorides. Sodium chloride is also satisfactory.

In operation, the capsule 10 is positioned so that the pin 12 is in its top position, as seen in FIG. 2. The capsule is then placed in the environment where the temperature is to be indicated. After the temperature reaches the preselected value, the fusible member 14 melts and the pin 12 and the fusible member 14 drops down into the void space 16, resulting in both a change in the center of gravity and a radiographic response. It will be appreciated that it is not necessary to open the capsule to determine if the melting point of the fusible member has been attained. The shift in the center of gravity may be measured or viewed by radiographic methods to determine whether or not the fusible member has liquefied, and hence indicating that the preselected temperature has been attained. A plurality of capsules containing fusible members of different melting points may be used to bracket the expected range of temperatures in a test, for example.

Attention is invited to the fact that the capsule constructed in accordance with my teachings have repeated usability without destruction of the capsule or any of the other elements. For example, if the fusible member has been liquefied during a test run, the capsule need only be inverted when reinserted for a subsequent test. If no melting of the fusible member has occurred, then no inversion is necessary for reinsertion in a subsequent test.

It will thus be seen that the present invention does indeed provide an improved temperatrue indicating device which is superior in simplicity, economy and efficiency as compared to pror art such devices.

Although a certain particular embodiment of the invention is herein disclosed for purposes of explanation, various modifications thereof, after study of this specification, will be apparent to those skilled in the art to which the invention pertains, and reference should accordingly be had to the appended claims in determining the scope of the invention.

What is claimed and desired to be secured by Letters Patent is:

1. A temperature indicting device for determining the temperature developed in a radioactive system, said device comprising an elongated sealed capsule fabricated from molybdenum, a fusible member contained within said capsule, a pin fabricated from tungsten disposed in said fusible member, said fusible member being inert with respect to molybdenum and tungsten and having a preselected melting point in the range of from about 125° centigrade to about 950° centigrade, said pin having a higher melting point than said fusible member, said pin having a specific density of greater magnitude than the specific desity of said fusible member when said fusible member is in its liquid state, said capsule being retained in axially vertical position when in operation and said pin being retainable at the top end of the capsule by said fusible member when said fusible member is in its solid state, a void space at the bottom end of said capsule, and said pin being movable by a force of gravity to said bottom end of said capsule when said fusible member changes from its solid state to its liquid state, and radiographic means disposed adjacent said capulse for radiographically viewing the position of said pin, thereby to determine whether said preselected temperature has been exceeded.

2. A temperature indicating device for determining the temperature developed in a radioactive system according to claim 1 wherein said fusible member is fabricated from a member of the class consisting of lead or lead alloy 3. A temperature indicating device for determining the temperature developed in a radioactive system according to claim 1 wherein said fusible member is fabricated from a member of the class consisting of aluminum or aluminum alloy.

4. A temperature indictaing device for determining the temperature developed in a radioactive system according to claim 1 wherein said fusible member is fabricated from sodium chloride.

References Cited

UNITED STATES PATENTS

| | | | |
|---|---|---|---|
| 1,633,298 | 6/1927 | Wahamaker | 73—358 |
| 2,788,282 | 4/1957 | Hammond. | |
| 2,856,930 | 10/1958 | Huyck et al. | |
| 2,915,405 | 12/1959 | Hammond et al. | |
| 2,983,247 | 5/1961 | Greenspon | 116—106 |
| 3,054,378 | 9/1962 | Bienfait | 116—114.5 |
| 3,090,236 | 5/1963 | Nicol | 73—358 |

LOUIS J. CAPOZI, Primary Examiner

U.S. Cl. X.R.

73—358